United States Patent [19]
Yang et al.

[11] Patent Number: 5,923,380
[45] Date of Patent: Jul. 13, 1999

[54] METHOD FOR REPLACING THE BACKGROUND OF AN IMAGE

[75] Inventors: Yibing Yang, Arlington; John C. Bowman, Lexington; Ibrahim Hajjahmad, Somerville, all of Mass.

[73] Assignee: Polaroid Corporation, Cambridge, Mass.

[21] Appl. No.: 08/591,727

[22] Filed: Jan. 25, 1996

Related U.S. Application Data

[63] Continuation-in-part of application No. 08/544,615, Oct. 18, 1995, Pat. No. 5,574,511.
[51] Int. Cl.$^6$ .................................................. H04N 9/74
[52] U.S. Cl. ......................... 348/586; 348/590; 348/591
[58] Field of Search ................................. 348/586, 590, 348/587, 588, 591, 592, 598, 164, 162; 382/190, 195; 352/49, 89, 46, 48; H04N 9/74

[56] References Cited

U.S. PATENT DOCUMENTS

| | | | |
|---|---|---|---|
| 4,751,571 | 6/1988 | Lillquist | 348/164 |
| 4,967,276 | 10/1990 | Murakami | 348/164 |
| 5,001,558 | 3/1991 | Burley | 348/164 |
| 5,386,242 | 1/1995 | Chaplin . | |
| 5,400,081 | 3/1995 | Chaplin . | |
| 5,574,511 | 11/1996 | Yang | 348/586 |

FOREIGN PATENT DOCUMENTS 07160869  6/1923  Japan .

*Primary Examiner*—Sherrie Hsia
*Attorney, Agent, or Firm*—Donald F. Mofford

[57] ABSTRACT

The present invention is useful in taking a visible light image for identification and other purposes without the requirement of a photobooth, regardless of the background of the visible light image. The original background of the visible light image is replaced with a preselected background. Two IR images with different intensities of IR illumination in the foreground and background regions of the scene, respectively, are compared to produce a difference image of light intensity differences between corresponding pixels of the two images. A binarized image is generated by binarizing the difference image with respect to a predetermined threshold value $\theta$. A connectivity constraint is used to generate a binary mask from the binarized image, then a gray-scale mask is produced by multiplying the binary mask times a preselected modulation function of the difference image. Warping the gray-scale mask produces a transformed mask. Finally, the background replaced visible light image is generated by blending the transformed mask with the visible light image, and replacing the original background with the preselected background.

14 Claims, 5 Drawing Sheets

METHOD FOR REPLACING THE BACKGROUND OF AN IMAGE

This application is a continuation-in-part of a copending U.S. application, Ser. No. 08/544,615, filed Oct. 18, 1995, U.S. Pat. No. 5,574,511 by Yang et al.

BACKGROUND OF THE INVENTION

The invention relates generally to a system and method for replacing the original background of a digitally captured image with a new background. More specifically, the invention relates to the generation and application of a mask for replacing the background of an image.

Photographic scenes and their images may be divided into distinct parts on the basis of their importance to overall scene content. In every scene there is usually some part that represents the subject of major interest with the remaining parts providing context. Generally, parts in the foreground of a scene usually predominant over background parts, but this is not always so because there are obviously those cases where the background conveys information vital to an overall understanding of a scene's full information content. However, there are kinds of scenes where the background is really of little significance and may even detract from the foreground. Most of these involve scenes populated by one or more nearby humans where the background could be dispensed with altogether or otherwise rendered unobtrusive. Official settings demanded for passports, identification badges, and drivers licenses are but a few examples of this type of scene which are contrived to eliminate any influence a background may have on the subject.

To have an "official" photograph made typically requires a specially designed and lighted setting in a studio or photography shop. Here, a neutral featureless background is supplied to provide a uniform field against which the subject's face or upper body is photographed. While this procedure is not generally inconvenient, it is not as convenient as being photographed at a booth or kiosk designed for autophotography, where one can take one's own photograph.

With traditional autophotographic devices, the background and illumination of the studio setting is usually mimicked but without the disadvantage of relying on a professional photographer to take the actual "picture". More recently, autophotographic devices have been advocated which allow a subject to be photographed against some ambient background that can change, thus eliminating the need for providing a real controlled background. Instead, it is proposed that the scene be imaged, the foreground and background separated, and the original background replaced by a preferred one suitable for the official purpose at hand—all to be done via digital image processing techniques. Afterwards the new image may be reproduced in hard copy form.

The parent case to this application discloses the general approach for replacing the background of an image by differentiating between two infrared (IR) light illuminated images to distinguish between the foreground and background of the corresponding visible light image. It specifically discloses a background replacement method where two IR images with different intensities of IR illumination in the foreground and background regions of the scene, respectively, are compared for light intensity differences between corresponding pixels of the two images to form a mask differentiating between the foreground and background regions of the image. The mask is then applied to a visible light image of the scene and the original background is replaced with a preselected background.

The primary object of the present invention is the generation and application of a mask for use with the background replacement system and method of the parent case. This and other objects will become apparent in view of the following description, drawings and claims.

SUMMARY OF THE INVENTION

The present invention is useful in taking a visible light image for identification and other purposes without the requirement of a photobooth, regardless of the background of the visible light image. The original background of the visible light image is replaced with a preselected background. Two IR images with different intensities of IR illumination in the foreground and background regions of the scene, respectively, are compared to produce a difference image of light intensity differences between corresponding pixels of the two images. A binarized image is generated by binarizing the difference image with respect to a predetermined threshold value $\theta$. A connectivity constraint is used to generate a binary mask from the binarized image, then a gray-scale mask is produced by multiplying the binary mask times a preselected modulation function of the difference image. Warping the gray-scale mask produces a transformed mask. Finally, the background replaced visible light image is generated by blending the transformed mask with the visible light image, and replacing the original background with the preselected background.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

Figure 1:
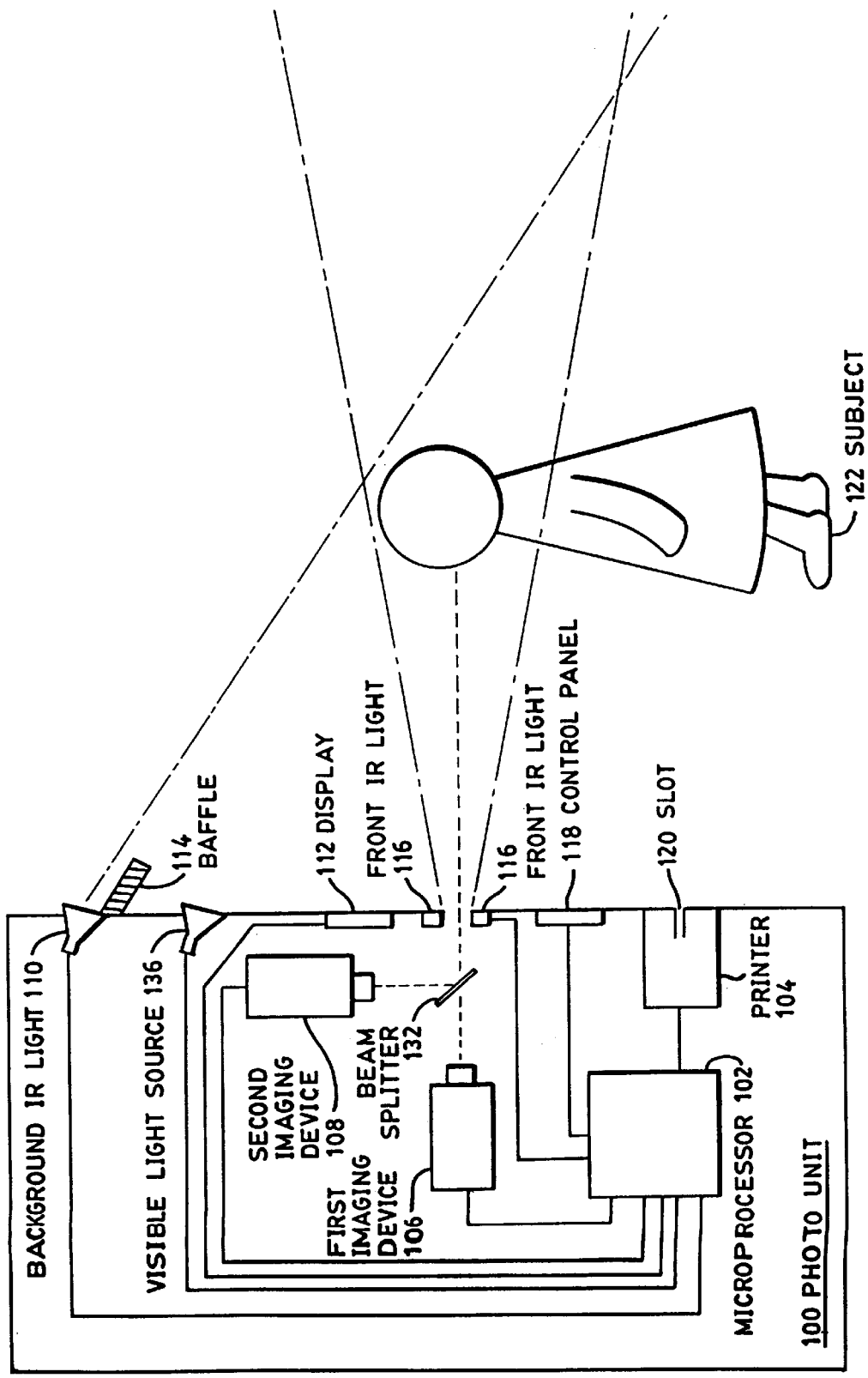
FIG. 1 is a diagrammatic representation of a photo unit 100 which includes a background replacement system as described herein.

The following description is provided to enable any person of ordinary skill in the art of electronic digital image processing to make and use the present invention. The description sets forth the best mode contemplated by the inventors for carrying out their invention. Various modifications are readily apparent to those skilled in the art, in accordance with the generic principles of the invention as defined herein.

Terminology

In order to more fully appreciate the invention as claimed, certain key words are defined for clarity. An image of a scene can be segmented into a foreground, a near background and a far background. The foreground includes objects near the imaging device which are the subject of the image, often a person. An active light source is a lamp that is used for supplying light to the scene. The near background is the part of the background which can be affected by an active light source, whereas the far background is the part of the background which can not be affected by an active light source. For instance, if a person is being photographed with a mountain range in the distance, an active light source will not affect the lighting on the mountain range, i.e. the far background. If however, a bush stands a few feet behind the subject within the range of the active light source, that bush is located in the near background. The terms background illumination and background lighting refer to the near background of a scene being illuminated by one or more active light sources in addition to any ambient illumination. The foreground is not illuminated by the active background lighting due to the use of baffles.

Similarly, the terms foreground illumination and foreground lighting refer to the foreground or subject of an image being illuminated by one or more active light sources in addition to any ambient illumination. The background is not illuminated by the active foreground lighting due to the use of baffles. The terms front lighting or front illumination refer to the case where one or more active light sources are positioned near the optical axis of the imaging device to illuminate the subject of the image. The line of demarcation is defined as the line of pixels that separates the foreground and background regions of a digital image. Two digital imaging devices have the same virtual spatial location when the images taken by the devices are identical. A digital imaging device includes any device such as, but not limited to, a CCD (charge-coupled device) photosensitive array. The digital imaging device could be, for instance, an electronic camera or a camcorder.

IR Background Replacement Method

An original background of a digitally captured image is replaced with a predetermined replacement background by comparing lighting characteristics between pixels of the image. One of the lighting characteristics that can be considered is light intensity. Another is the contrast ratio, defined as the ratio of intensity values of pixels at the same, i.e. corresponding, location that are compared between two images of the same scene taken at the same time.

Illuminating the background and foreground regions of the image with lights of different intensities, i.e. different illumination patterns, provides a useful mode of comparison. A comparison of all pixels in the image provides information which can be analyzed to delineate the foreground and background regions of the image. However, several problems do exist.

Measurement of light intensity is directly related to the reflectance of an object from which the light is being measured. For instance, if an object is illuminated with light and exhibits a high reflectance, then most of the light incident to the object is reflected and available for measurement. However, a problem occurs if the object being illuminated has a low reflectance, since only a small amount of the light incident to the object is reflected and available for measurement.

When photographing for identification purposes, the subject of the image is generally a person. Thus, the hairline of the subject will generally follow the line of demarcation separating the foreground and background regions of the image. It is known that blonde hair exhibits high reflectance and black hair exhibits low reflectance to visible light. Thus when a person having black hair is the subject of an image, the intensity of the reflected visible light incident to the black hair will be small, difficult to measure, and unacceptable for intensity comparisons. On the other hand, light in the IR region of the light spectrum exhibits high reflectance characteristics for both blonde and black hair. Furthermore, the spectral sensitivity of commercially available CCDs includes the visible light range of approximately 400 to 700 nanometers, and the near infrared range of approximately 700 to 1000 nanometers. Thus, active light sources in the near infrared range are preferred for intensity comparisons.

In keeping with the IR background replacement method, an image can be taken regardless of the background of the scene. Thus, a photobooth or backdrop behind the subject is not required. However, a careful analysis of both the active and ambient lighting is in order. A scene can be dissected into three regions; a foreground region, a near background region and a far background region. The foreground region includes objects near the imaging device which are the subject of the image, often a person. The near background region is the part of the background which can be affected by an active light source. The far background region is the part of the background which can not be affected by an active light source. For two IR images with different illumination patterns, a comparison of light intensity of pixels at each of the above three regions under varied lighting conditions will provide information necessary for creating a mask for separating the foreground and background regions of an image of the scene. In other words, the contrast ratios of intensity values of pixels at corresponding locations of the two IR images will vary between the foreground and background regions.

Figure 2:
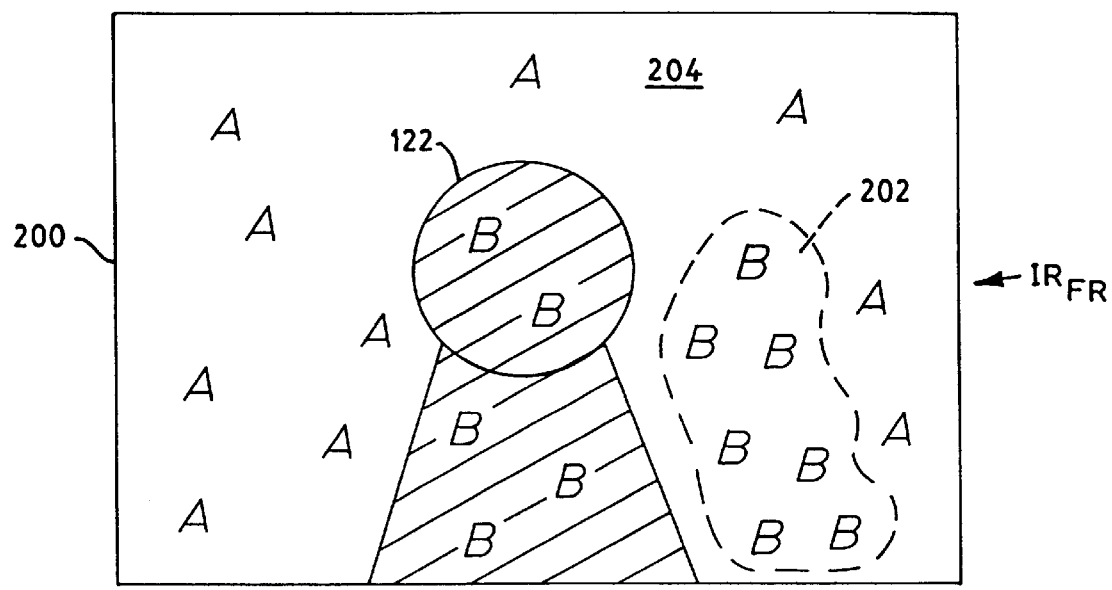
FIG. 2 illustrates a front illuminated IR image of a scene.
Figure 3:
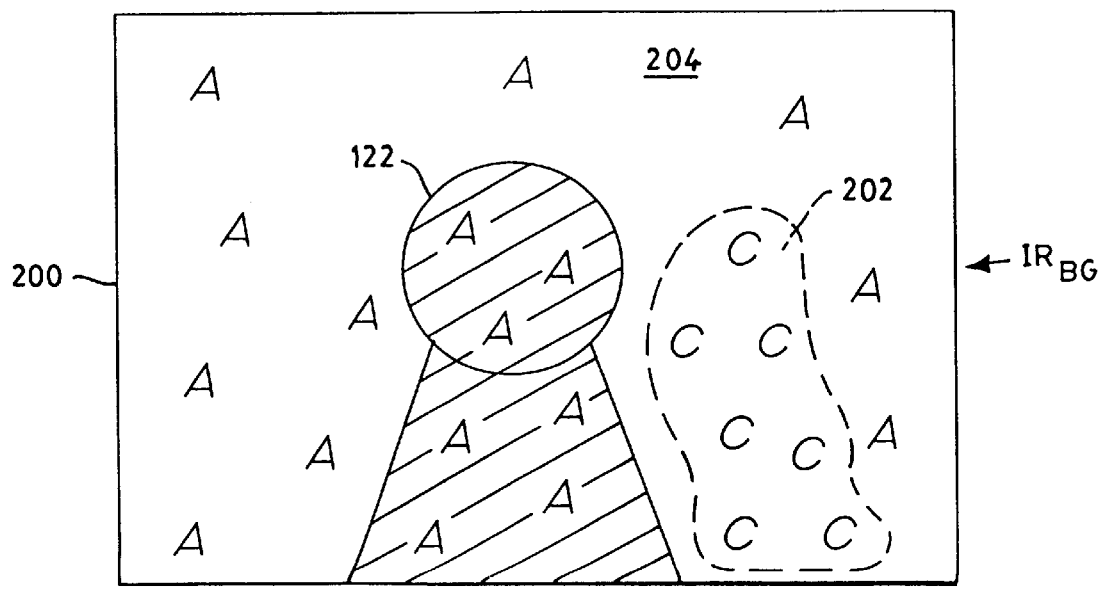
FIG. 3 illustrates a background illuminated IR image of the same scene as FIG. 2.

Two IR images are taken of the same scene under different lighting conditions. The first IR image, shown in FIG. 2, is a front IR image $IR_{fr}$ illuminated with front infrared radiation. The second IR image, shown in FIG. 3, is a background IR image $IR_{bg}$ illuminated with background infrared illumination. Each image includes a foreground 122 and a background 200 which is further broken down into a near background region 202 having objects which are affected by active light sources, and a far background region 204 having objects which are not affected by active light sources.

FIG. 2 shows the front illuminated IR image $IR_{fr}$ taken with front IR lighting. Of course, ambient (i.e. non-active) IR foreground and background lighting will also be present in some amount for illuminating both the foreground 202 and the background 200. Only ambient IR light having intensity "A" is reflected at various pixels in the far background since the front IR lighting is incapable of effecting the lighting of the far background. For instance, if the scene is a person standing in a lobby of a large building with a back wall 75 feet away, then the active IR lighting, i.e. the front IR lighting, will not illuminate the far background of the back wall. The front IR light, in combination with the ambient IR light, is capable of illuminating objects in the foreground 122 and the near background 202 at a light intensity "B" which is greater than the ambient IR light intensity "A".

FIG. 3 shows a background illuminated IR image $IR_{bg}$ taken with no active front IR illumination (i.e. only ambient IR lighting is present in the foreground 122) and one or more background IR lights which have been activated to illuminate, in combination with any ambient IR lighting, objects in the near background region 202 of the background 200. Ambient IR light is reflected from pixels in the foreground and far background regions having an intensity of "A", and the background IR lighting combined with the ambient IR lighting is reflected from pixels in the near background region having an intensity of "C" which is greater than the intensity "B" of the front lighting in FIG. 2. For this preferred method, the intensity of the background lighting is greater than the intensity of the front lighting so that the relationships detailed in the following Table I will hold true. However, if the front lighting is given a greater intensity than the background lighting, then a different set of mathematical relationships would be attained for Table I.

The images $IR_{fr}$ and $IR_{bg}$ are preferably taken with the same IR imaging device in near temporal proximity, limited only by the shutter speed of the IR imaging device and the time necessary to switch the active IR lighting. By taking the two IR images as close together as possible in time, problems created by the movement of the subject or of objects in the near background can be avoided. More specifically, as long as the movement of the line of demarcation between the exposures is not detectable by the human eye, then the movement of the subject is negligible. Typically, a maximum time differential between exposures of, for example, about 1/30th of a second (i.e. a typical shutter speed of an electronic camera) will ensure negligible movement of the subject. Of course, if the subject of the image is stationary, then the two IR images can be taken at any time.

After the two IR images are taken and stored in digital form, they are compared on a pixel-by-pixel basis to create a mask for delineating the foreground from the background. For the present preferred example comparing two IR images, one with front IR illumination and the other with background IR illumination, the following relationships of Table I preside for each corresponding pixel location (i,j) of each image, i and j being integers.

TABLE I

| Foreground pixel | $IR_{fr}$ (i,j) > $IR_{bg}$ (i,j) |
|---|---|
| Far background pixel | $IR_{fr}$ (i,j) = $IR_{bg}$ (i,j) |
| Near background pixel | $IR_{fr}$ (i,j) < $IR_{bg}$ (i,j) |

Thus, if a given pixel in $IR_{bg}$ has a greater intensity at the same pixel location in $IR_{fr}$, then that pixel is identified in the mask as a foreground pixel; if a given pixel in $IR_{bg}$ has the same intensity at the same pixel location in $IR_{fr}$, then that pixel is identified in the mask as a far background pixel; and if a given pixel in $IR_{bg}$ has a lesser intensity at the same pixel location in $IR_{fr}$, then that pixel is identified in the mask as a near background pixel.

IR Background Replacement System

A preferred background replacement system is incorporated into a photo unit 100 (see FIG. 1) for taking a picture of a subject 122, such as for identification purposes. The photo unit 100 could be conveniently located, such as at a Post Office, where an original background could be replaced by any desirable preselected background. The subject 122 operates the photo unit 100 via a control panel 118 which is connected to a microprocessor 102. Two imaging devices 106 and 108 having the same virtual spatial location are implemented. Both of the imaging devices 106 and 108 are compatible electronic cameras capable of capturing an image in digital form. Furthermore, one of the imaging devices 108 is capable of capturing an IR image by using an IR pass, visible reject filter while the other imaging device 106 is capable of capturing a visible light image by using an IR reject, visible pass filter. The photo unit 100 also includes one or more background IR lights 110 with baffles 114, a front IR light 116, a visible light source 136, a display 112, a beam splitter 132, and a printer 104. The front IR light 116, the background IR lights 110, and the visible light source 136 are all active light sources. The front IR light 116 emits near IR radiation at a first intensity, background IR lights 110 emit near IR radiation at a second intensity greater than the first intensity, and the visible light source 136 emits visible light.

The subject 122 first selects one of a number of replacement backgrounds, then activates the photo unit 100 to begin the photo taking procedure. A preview of the visible light image appears on the display 112 and the user continues by pressing a button to take the two IR and one visible light images. The background IR light 110 is activated to illuminate the near background with near IR light at a first intensity and a background illuminated IR image $IR_{bg}$, as shown in FIG. 3, is taken with the imaging device 108. Within about 1/30th of a second (i.e. the shutter speed of the imaging devices), the background IR light 110 is deactivated, the visible light source 136 is activated, and the front IR light 116 having a second intensity less than the first intensity is activated. At that time, the imaging device 108 takes a front illuminated IR image $IR_{fr}$, as shown in FIG. 2, and the second imaging device 108 simultaneously takes a visible light image. Shortly thereafter the front IR light 116 and the visible light 136 are deactivated.

Each of the components of the photo unit 100 is controlled by the microprocessor 102 as well understood by those skilled in the art. The microprocessor 102 collects and stores records of the first IR image, the second IR image and the visible light image. The difference between intensities at corresponding pixels of the first and second IR images is determined by the microprocessor 102 to form a mask which discriminates the foreground 122 from the background 200 regions of the images. This mask is then applied to the visible light image to create a modified visible light image by replacing the original background with the new preselected background. A print of the modified visible light image can be retrieved from a slot or tray 120 within printer 104.

In the above preferred system the subject 122 is illuminated by a front IR light 116 which is positioned so that every image data point, i.e. pixel, of the subject 122 is illuminated without shadows. Ideally, the front IR light 116 should be located as close as possible to the optical axis of the imaging devices.

The above preferred embodiment of the inventive method and apparatus uses two IR images, one illuminated with front IR lighting and the other illuminated with background IR lighting. This scheme provides the best results for photographing a person and replacing the background. However, many variations exist of the general scheme for comparing light intensities at each corresponding pixel between two images under different lighting conditions. For instance, a different part of the light spectrum can be used to expose the images to be compared or, the order and timing of taking the various images can be changed. Furthermore, the front IR lighting could be replaced with foreground IR lighting. In that particular case, the first IR image would be a foreground IR image $IR_{fg}$ taken using one or more foreground lights directed by baffles to illuminate the foreground of the scene with no background IR illumination other than ambient. The second IR image would be an ambient IR image $I_{am}$ taken with only ambient IR illumination in both the foreground and the background. In the ideal case, the pixels of the mask are created by comparing $IR_{fg}$ with $IR_{am}$ according to Table II for each corresponding pixel location (i,j) of each image, i and j being integers.

TABLE II

| Foreground pixel | $IR_{fg}(i,j) > IR_{am}(i,j)$ |
|---|---|
| Background pixel | $IR_{fg}(i,j) \leq IR_{am}(i,j)$ |

Thus, if a given pixel in $IR_{fg}$ has a greater intensity at the same pixel location in $IR_{am}$, then that pixel is identified in the mask as a foreground pixel; and if a given pixel in $IR_{fg}$ has the same or lesser intensity at the same pixel location in $IR_{am}$, then that pixel is identified in the mask as a background pixel.

The imaging devices 106 and 108 preferably are one color CCD type and one black and white CCD type (although two color CCD types are acceptable) with a good quality television lens of a desired focal length and filtered to restrict the spectral sensitivity to a desired spectral band. Compatible color video cameras 106 and 108 are preferred whereby one of the cameras is modified with an IR pass, visible reject filter to be able to record an IR image. All of the variables for taking a photograph such as the depth of field, focal length, etc. are easily established as necessary by one of ordinary skill in imaging science.

In an experimental setup used for testing the invention at Polaroid's Imaging Science Laboratory, a single imaging device was used for taking both the IR and visible light images of a mannequin. The imaging device consisted of a Philips CM800 black & white NTSC format (640×480 pixels) CCD camera with color separations made using wratten 25 (red), 58 (green) and 47B (blue) filters. Red, green and blue images were individually recorded during testing. Color balance was adjusted using wratten neutral density filters and/or changing the lamp voltage for the three color filter exposures. The camera included a Computar f/1.4 16 mm FL lens with a 1 mm BG18 glass filter for IR rejection and a wratten 87B gel filter for visible light rejection. Digitization was accomplished using a Data Translation DT55-LC frame grabber with 7 bits of quantization.

Different size apertures can be used in the visible and infrared cameras, since the warping step will correct any misalignments between the visible and IR images. However, the best system includes visible and infrared cameras having the same size apertures. The infrared camera preferably should have a large aperture so that the background in the infrared images will be blurred. To the extreme, the background will appear uniform for both infrared images, but brighter when the background is illuminated. The influx of light can be controlled by using a transparency with an appropriate transmission rate. Most importantly, the infrared camera used should respond sensitively to small light intensity changes when the light is weak.

The foreground illumination for both the visible and near IR ranges in the test system was provided by three tungsten halogen Lowell Pro-Lights, model P1-10 (125 watts, 3200K @ 120 volts) which were each placed between 1 and 2 feet from the optical axis of the camera 200 and approximately 2.5 feet from the subject. Exposure was controlled by changing the lamp voltage. The background illumination for the appropriate IR image record was provided by three tungsten halogen Lowell Tota-Lights, model T1-10 (500 watts, 3200K @ 120 volts) with barn doors excluding the background lighting from behind the subject.

Mask Generation

Mask generation is a crucial task in background replacement. For the inventive background replacement method, a mask is generated for accurately distinguishing between the foreground and the background of an image. In one preferred embodiment, the foreground of the image is a person having his picture taken for identification purposes and the background is everything else in the image.

Figure 4:
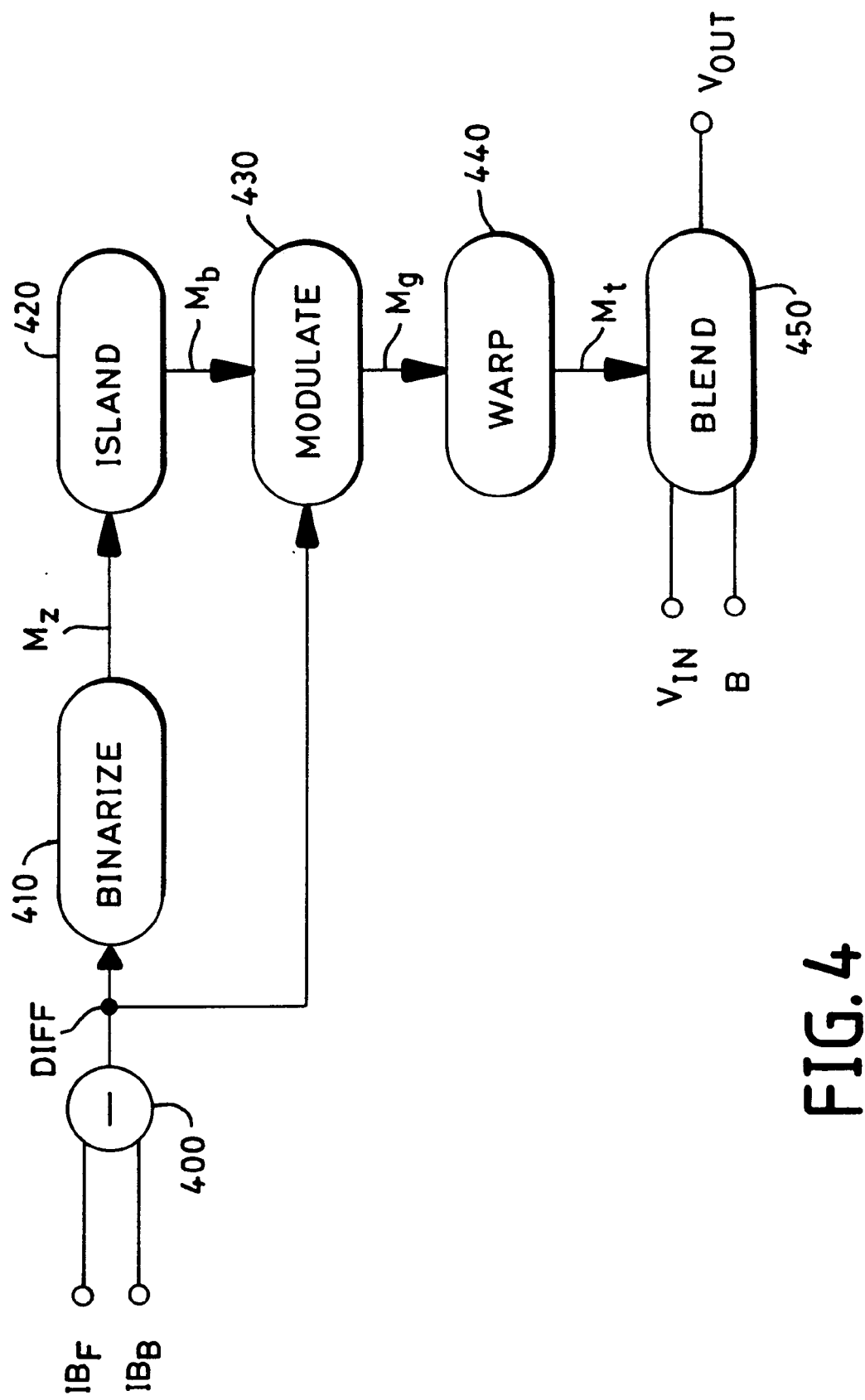
FIG. 4 is a block diagram of preferred steps in a first configuration of the inventive background replacement method.

The basic mask generation method as claimed is outlined in the block diagram of FIG. 4. Assume that the front illuminated IR image $IR_f(i,j)$, the background illuminated IR image $IR_b(i,j)$, the visible light image $V_{in}(i,j)$ and the predetermined replacement background $B(i,j)$ have all been determined as described in the above sections, where i and j are integers which represent the horizontal and vertical coordinates of the images, respectively. A foreground pixel has the property $IR_f(i,j) > IR_b(i,j)$ and a background pixel has the property of either $IR_f(i,j)=IR_b(i,j)$ or $IR_f(i,j)<IR_b(i,j)$ depending upon whether or not the pixel is illuminated by active lights. In a typical system, each pixel of $IR_f(i,j)$ and $IR_b(i,j)$ is represented as $0 \leq IR_f(i,j) \leq 255$ or $0 \leq IR_b(i,j) \leq 255$, respectively. Subtracting $IR_b(i,j)$ from $IR_f(i,j)$ in step 400 yields a difference image $DIFF(i,j)$ where each pixel is represented as $-255 \leq DIFF(i,j) \leq +255$. A sample 8×8 point difference image $DIFF(i,j)$ for $i,j=0,1 \ldots 7$ is shown below.

| DIFF(i,j) | | | | | | | |
|---|---|---|---|---|---|---|---|
| 0 | 0 | 0 | −1 | 1 | 0 | −1 | 1 |
| 0 | 15 | 17 | 0 | 1 | 0 | 1 | 1 |
| 6 | −2 | −4 | −1 | 0 | 0 | 1 | 1 |
| −1 | 0 | 0 | 0 | 0 | 2 | 1 | 1 |
| 8 | 0 | 5 | 60 | 13 | 6 | 3 | 2 |
| 1 | −4 | 27 | 250 | 212 | 11 | 5 | 4 |
| −1 | 6 | 33 | 30 | 19 | 12 | 0 | 10 |
| −2 | 1 | 15 | 22 | 168 | 15 | 0 | 0 |

$DIFF(i,j)$ is binarized in step 410 to form a binarized image $M_z(i,j)$ by comparing the numerical value of each pixel of DIFF to a predetermined threshold value $\theta$, then setting all pixel values which are greater than $\theta$ to a logic high and all pixel values which are less than or equal to $\theta$ to a logic low. This type of pixel classification is mathematically written as:

$$M_z(i,j)=1, \text{ if } DIFF(i,j)>\theta, \text{ or} \quad (1)$$

$$M_z(i,j)=0, \text{ otherwise,}$$

where $\theta$ is a predetermined parameter which will be discussed in further detail hereinafter in conjunction with calculations for the modulation function of step 430.

The following 8×8 binarized image $M_z(i,j)$ of the above difference image DIFF is illustrative for $i,j=0,1 \ldots 7$ when $\theta=5$.

| $M_Z$ (for $\theta$ = 5) | | | | | | | |
|---|---|---|---|---|---|---|---|
| 0 | 0 | 0 | 0 | 0 | 0 | 0 | 0 |
| 0 | 1 | 1 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 1 | 0 | 0 | 1 | 1 | 1 | 0 | 0 |
| 0 | 0 | 1 | 1 | 1 | 1 | 0 | 0 |
| 0 | 1 | 1 | 1 | 1 | 1 | 0 | 1 |
| 0 | 0 | 1 | 1 | 1 | 1 | 0 | 0 |

Note that a change in $\theta$ can cause a significant change in the appearance and values of the binarized image $M_z(i,j)$. Contrast the above binarized image for $\theta=5$ with the following binarized image for $\theta=10$.

| $M_z$ (for θ = 10) | | | | | | | |
|---|---|---|---|---|---|---|---|
| 0 | 0 | 0 | 0 | 0 | 0 | 0 | 0 |
| 0 | 1 | 1 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 1 | 0 | 0 | 0 |
| 0 | 0 | 0 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |

Note that the mix of foreground and background pixels has changed, i.e. there are fewer foreground pixels in the binarized image $M_z$ when θ=10 than when θ=5. Generally as θ increases, the number of foreground pixels decreases.

A logic low value in the binarized image $M_z$, as shown above, designates a definite background pixel. However, a logic high value designates only a probable foreground pixel, since it is possible that $M_z$ may contain some false foreground pixels due to noise. False foreground pixels can be identified and removed using a foreground connectivity constraint. The foreground connectivity constraint defines the foreground region as the single largest region of contiguous foreground pixels, i.e. the region where the largest number of adjacent foreground pixels are located. This region is identified as the group of pixels within the dotted line shown in $M_z$ for θ=10 above, and (in the scene of FIG. 6) where the image is composed of the foreground 602 and 604 and the background 600.

Figure 6:
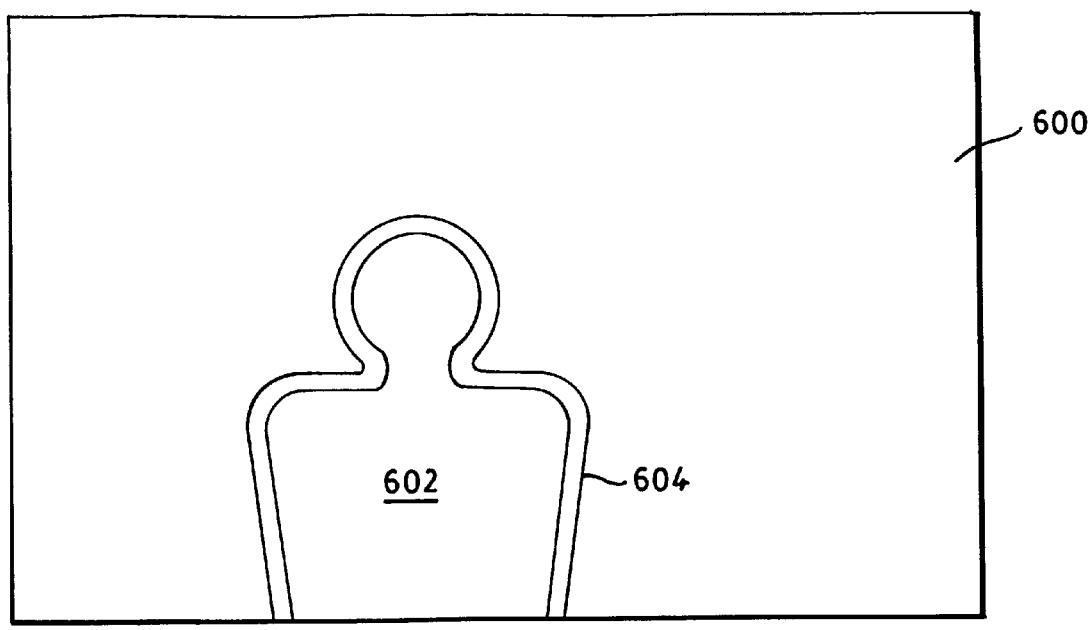
FIG. 6 illustrates a scene divided into background and foreground regions.

The image of FIG. 6 can be characterized as a foreground island 602 and 604 surrounded by a background ocean 600. In a typical identification photo, the foreground island consists of a large group of adjacent foreground pixels located about the lower central region of the image. Hence, false foreground pixels are easily identified as separate from the foreground pixels of the main foreground island 602 and 604. These false foreground pixels are set to logic low background pixels in island step 420 according to the foreground connectivity constraint. Using the foreground connectivity constraint for the above binarized image $M_z$ where θ=10, pixels $M_z(1,1)$ and $M_z(2,1)$ are identified as false foreground pixels. These pixels are removed in step 420 and the image representation, i.e. binary mask, $M_b(i,j)$ becomes:

| $M_b$ (for θ = 10) | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 1 | 0 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |

The line of demarcation separating the foreground and background regions of the image is generally hazy rather than sharp. For instance, a hair strand belonging to the foreground subject has only sub-pixel width. Thus a pixel containing both a hair strand and background information can be thought of as having certain percentages of both foreground and background information. These modulated pixels are located in the edge region 604 of the foreground shown in FIG. 6. The pixels located in the foreground plateau 602 all have values of 1; the pixels located in the background 600 all have values of 0; and the pixels located in the edge 604 all have values that are both greater than 0 and less than 1.

The appropriate percentages of foreground and background information in each pixel in the edge region 604 is determined in mask modulation step 430 where a gray-scale mask $M_g$ is generated according to the equation:

$$M_g(i,j) = M_b(i,j) \cdot f(\text{DIFF}(i,j)). \tag{2}$$

$M_g(i,j)$ is a gray-scale mask, $M_b(i,j)$ is the binary mask, DIFF(i,j) is the difference image, and f(DIFF(i,j)) is a predefined modulation function varying in value from 0 to 1. In equation (2), the gray-scale mask $M_g$ is generated using pixel-by-pixel multiplication of the binary mask $M_b$ times the modulation function f(x)=f(DIFF(i,j)).

Figure 7:
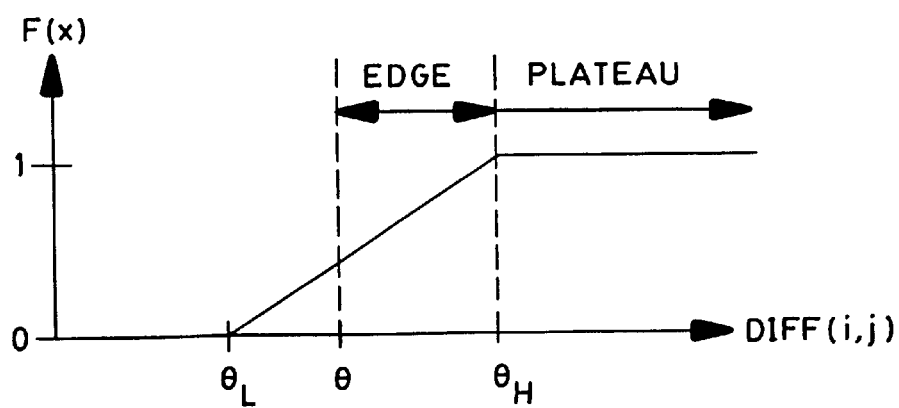
FIG. 7 is a plot of values of a modulation function f(x) versus values of a difference image DIFF(i,j).

A preferred modulation function f(x) taken in conjunction with FIG. 7 (where θ, $θ_L$ and $θ_H$ are predetermined parameters shown in a preferred configuration) is defined as:

$$f(x) = 0, \text{ if } x \leq θ_L, \tag{3}$$
$$= (x - θ_L)/(θ_H - θ_L), \text{ if } θ_L < x < θ_H, \text{ and}$$
$$= 1, \text{ if } x \geq θ_H.$$

FIG. 7 is a plot of the gray-scale mask values versus the difference image values where f(x) for x=DIFF(i,j) is defined in equation (3) above. Every pixel in the edge region 604 has a value both greater than $θ_L$ and less than $θ_H$. In order to modulate the foreground pixels located throughout the edge region 604 of the binary mask $M_b$ for θ=10, each pixel has a corresponding location in DIFF(i,j) whose value is multiplied by the appropriate functional value f(x). Of course, all the background pixels located in the background 600 of gray-scale mask $M_b$ will remain 0, but each foreground pixel will be modulated between 0 and 1 according to the modulation function f(x). All pixels located in the foreground plateau 602 have $M_g$ gray-scale mask values of 1 where DIFF is greater than $θ_H$ in accordance with the modulation function f(x) (see also FIG. 7). When DIFF is less than or equal to $θ_L$, then $M_g$ is 0. Finally, if DIFF is both greater than $θ_L$ and less than $θ_H$, then the gray-scale mask $M_g$ is modulated between 0 and 1. The edge region 604 of the foreground is represented as the area where the value of DIFF is between θ and $θ_H$. The pixels in this area contain both foreground and background information. The modulated gray-scale mask $M_g$ produces natural looking background replacement results.

θ is empirically chosen as an integer value between 0 and 255 inclusive. The best value of θ will vary according to variations in lighting and imaging device response characteristics. For the experimental setup previously described including a Philips CM800 camera and tungsten light sources, θ=10 was experimentally determined as the best fit. θ controls the size and shape of the foreground island. As θ increases, the foreground decreases. $θ_L$ also designates the minimum value of a pixel in the edge region 604. If $θ_L$=θ (as in the preferred embodiment), then the minimum value of a pixel in the edge region 604 is slightly greater than 0. Of course if $θ_L$ is decreased, then the minimum value of a pixel in the edge region 604 increases. Thus, the strength of the edge is controlled by $θ_L$. As $θ_L$ approaches negative infinity, there is no effective modulation between the foreground and background, i.e. the mask value of each of the edge pixels is approximately 1.

After the gray-scale mask $M_g$ is generated in the modulation step 430, the pixels of $M_g$ are aligned with corresponding pixels in the visible light image $V_{in}$ so that corresponding points in $M_g$ and $V_{in}$ have the same coordinates. This procedure called warping or image registration occurs in step 440 and results in a transformed mask $M_t(i,j)$. The warping parameters are predetermined by means of calibration as known in the art. Finally in step 450, the transformed mask $M_t$ is applied to the visible light image $V_{in}$ and the predetermined background B replaces the original background to generate the background replaced image $V_{out}$. In other words, $$V_{out}(i,j)=M_g(i,j)V_{in}(i,j)+(1-M_g(i,j))B(i,j). \quad (4)$$

Figure 5:
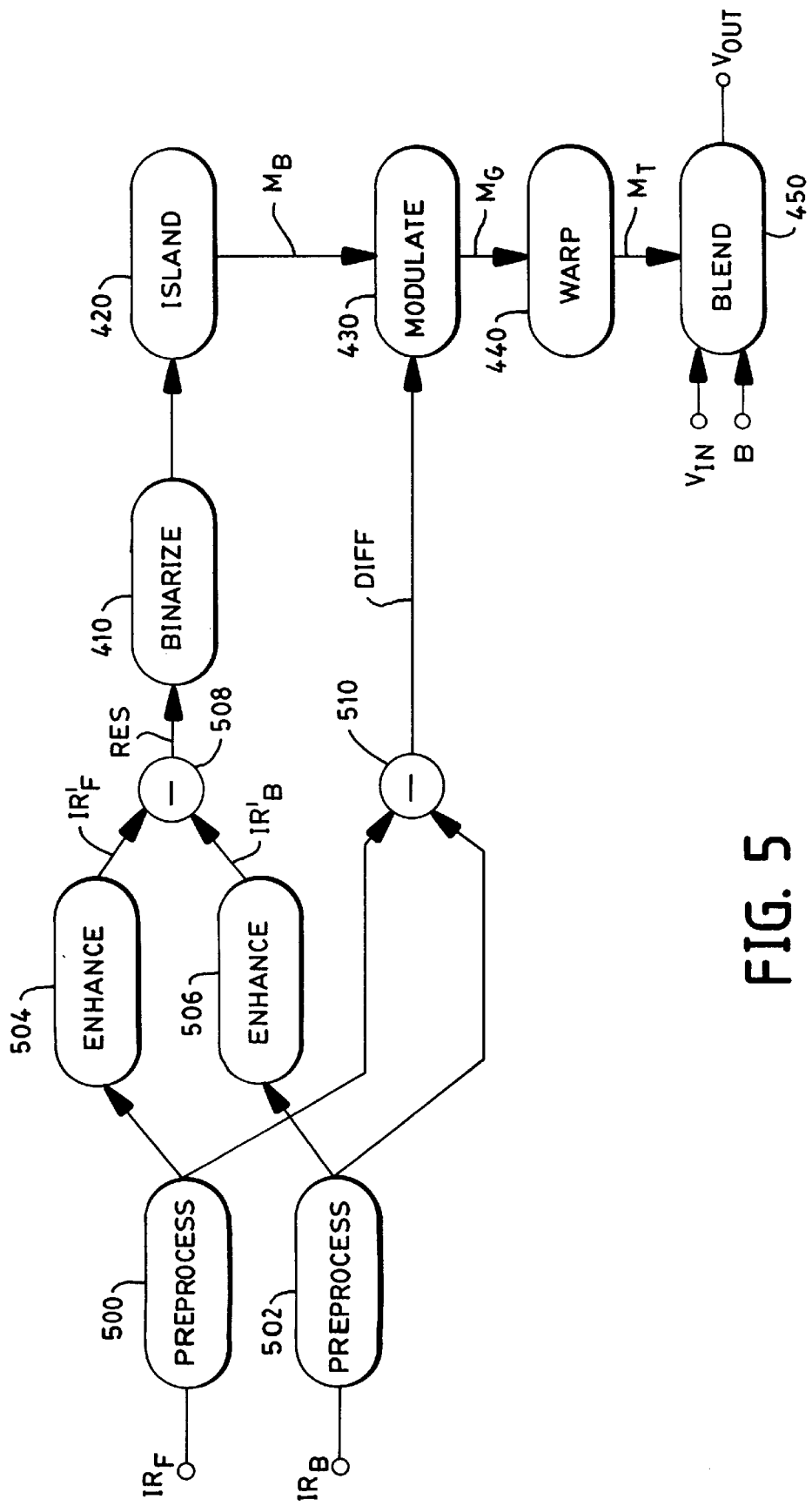
FIG. 5 is a block diagram of preferred steps in a second configuration of the inventive background replacement method.

The second preferred configuration of the inventive background replacement method, as shown in FIG. 5, addresses the difficulty of coping with small features, such as hair strands, which have sub-pixel width. A foreground hair strand could possibly be misclassified as background by the previously described pixel classification rule for generating the binarized image $M_z(i,j)$. This problem can be overcome by enhancing details of the IR image in enhance steps 504 and 506 prior to pixel classification. However, steps 504 and 506 involve high pass filtering which could possibly introduce or amplify noise. Thus, it is best to first preprocess the IR images by low pass filtering in preprocess steps 500 and 502.

In step 510 of FIG. 5, the difference between the preprocessed IR images yields DIFF. Also, each of the preprocessed IR images is enhanced in steps 504 and 506. The enhanced front illuminated IR image, $IR_F'$, is written as:

$$IR_f'(i,j)=IR_f+\alpha DET_f \quad (5)$$

where $IR_f$ is the front illuminated IR image, $\alpha$ is a predetermined parameter specifying the amount of enhancement, and $DET_f$ is a measure of the details residing in $IR_f$. The parameter $\alpha$ is actually an experimentally derived constant. $DET_f$ captures or measures details residing in $IR_f$ by using, for example, the Laplacian filter of equation (6):

$$DET_f=\max\{-\Delta IR_f(i,j), 0\} \quad (6)$$

where $\Delta$ is the Laplacian operator. Similarly, $IR_b'(i,j)=IR_b+\alpha DET_b$, and $DET_b=\max\{-\Delta IR_b(i,j), 0\}$ for the background image. Other known filters could be used in place of the Laplacian.

Still, a foreground point has the property $IR_f'(i,j)>IR_b'(i,j)$, and a background point has the property $IR_f'(i,j)\leq IR_b'(ij)$. Furthermore the decision rule for pixel classification in the binarizing step 410 of FIG. 5 is:

$$M_z(i,j) = 1, \text{ if } RES(i,j) > 0, \text{ or} \quad (7)$$
$$= 0, \text{ otherwise}$$

where the residue image $RES=IR_f'-IR_b'$ is determined in step 508. Binarization of the residue image RES can be interpreted as adaptive thresholding of the difference image. In fact, the expression $RES(i,j)>0$ can be rewritten as $IR_f-IR_b>\theta_a$, where $\theta$ a is spatially adaptive according to local busyness (i.e. $DET_f-DET_b$) scaled by $\alpha$.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. A digital processing method of replacing an original background of a visible light image of a scene with a predetermined replacement background, said method comprising the steps of:

making a first infrared (IR) image of the scene at a first time while illuminating the original background with first IR radiation having a first intensity;

measuring the intensity of IR radiation at each pixel of said first IR image;

making a second IR image of the scene at a second time after deactivating said first IR radiation, while illuminating a foreground of the scene with second IR radiation having a second intensity less than said first intensity;

measuring the intensity of IR radiation at each pixel of said second IR image;

making the visible light image of the scene at a third time while illuminating the scene with visible lighting;

generating a transformed mask distinguishing said foreground from said original background by producing a difference image (DIFF), a binarized image, a binary mask and a gray-scale mask; and producing a modified visible light image by blending said visible light image with said predetermined replacement background, using said transformed mask.

2. The method of claim 1, wherein said step of generating a transform mask further comprises the steps of:

producing the difference image by subtracting the second IR image from the first IR image;

producing the binarized image distinguishing said foreground from said original background by comparing pixels of said difference image to a predetermined parameter $\theta$, then setting a pixel of the binarized image to a logic high when said pixel of the binarized image is greater than $\theta$, otherwise setting said pixel of the binarized image to a logic low;

producing the binary mask from the binarized image by removing false foreground pixels of the binarized image according to a connectivity constraint;

producing the gray-scale mask specifying how much of each pixel of the binary mask is attributed to the foreground and how much of each pixel of the binary mask is attributed to the original background by applying a predetermined modulation function of the difference image to the binary mask; and producing the transformed mask by pixel-to-pixel image registration of the gray-scale mask and the visible light image.

3. The method of claim 2, wherein for a given pixel of the gray-scale mask said predetermined modulation function equals: $(DIFF-\theta_L)/(\theta_H-\theta_L)$ if a corresponding pixel in the difference image is less than a predetermined parameter $\theta_H$ and greater than a predetermined parameter $\theta_L$; 0, if the corresponding pixel in the difference image is less than or equal to $\theta_L$; and 1, if the corresponding pixel in the difference image is greater than or equal to $\theta_H$.

4. The method of claim 1, wherein said second IR radiation originates from a front light.

5. The method of claim 1, wherein said second IR radiation originates from one or more foreground lights.

6. The method of claim 1, wherein said second IR radiation originates from ambient light.

7. The method of claim 1, wherein said third time equals said second time.

8. The method of claim 1, wherein said first IR radiation originates from one or more background lights.

9. The method of claim 1, wherein said first IR radiation originates from ambient light.

10. The method of claim 1, wherein said first IR radiation and said second IR radiation both have wavelengths ranging from about 700 nanometers to about 1000 nanometers.

11. The method of claim 1, wherein a difference between said first time and said second time approximates a shutter speed of an imaging device for making said first IR image, said second IR image and said visible light image.

12. The method of claim 1, wherein a difference between said first time and said second time is about 1/30th of a second.

13. The method of claim 1, wherein a difference between said first time and said second time ensures negligible movement of objects within said scene while taking said first IR, second IR and visible light images so that said images will be in focus.

14. The method of claim 1, wherein both said first and second IR images are taken with a first digital imaging device, said visible light image is taken with a second digital imaging device, and said first and second digital imaging devices have the same virtual spatial location.

* * * * *